United States Patent [19]

Raftis

[11] Patent Number: 4,492,253
[45] Date of Patent: Jan. 8, 1985

[54] TIDE GATE VALVE

[75] Inventor: Spiros G. Raftis, Pittsburgh, Pa.

[73] Assignee: Red Valve Company, Inc., Carnegie, Pa.

[21] Appl. No.: 384,102

[22] Filed: Jun. 1, 1982

Related U.S. Application Data

[63] Continuation-in-part of Ser. No. 220,962, Dec. 29, 1980, abandoned.

[51] Int. Cl.³ .............................................. F16K 15/14
[52] U.S. Cl. .................................................... 137/849
[58] Field of Search ....................... 137/849, 846, 847; 222/494

[56] References Cited

U.S. PATENT DOCUMENTS

| 4,030,142 | 6/1977 | Wolfe ................................... 137/847 |
| 4,071,038 | 1/1978 | Robinson ............................. 137/460 |
| 4,135,550 | 1/1979 | Andersson ........................... 137/846 |
| 4,139,124 | 2/1979 | Ferrante .............................. 222/494 |
| 4,222,126 | 9/1980 | Boretos et al. ....................... 137/849 |

FOREIGN PATENT DOCUMENTS 917036 12/1972 Canada ................................. 137/849

Primary Examiner—Martin P. Schwadron
Assistant Examiner—Sheri Novack
Attorney, Agent, or Firm—Kirschstein, Kirschstein, Ottinger & Israel

[57] ABSTRACT

A tide gate check valve in which at least three converging sides are provided at a tapered region of a flexible sleeve, so that on reverse back pressure build-up of fluid, reverse fluid flow is prevented, while the valve sleeve does not invert or collapse. The present configuration features embedded reinforcing elements for resisting inversion or collapsing when the back pressure builds up. This feature is especially important for large-sized conduits of 36" or 72" diameter, or even larger, such as are common in storm sewer applications.

4 Claims, 8 Drawing Figures

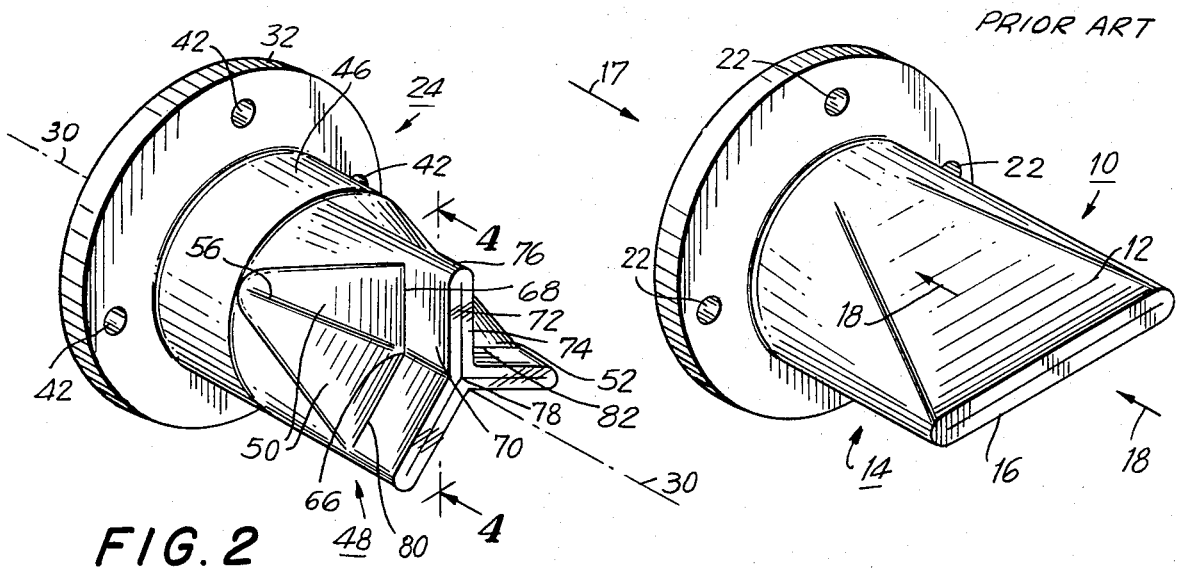
FIG. 1 PRIOR ART
FIG. 2
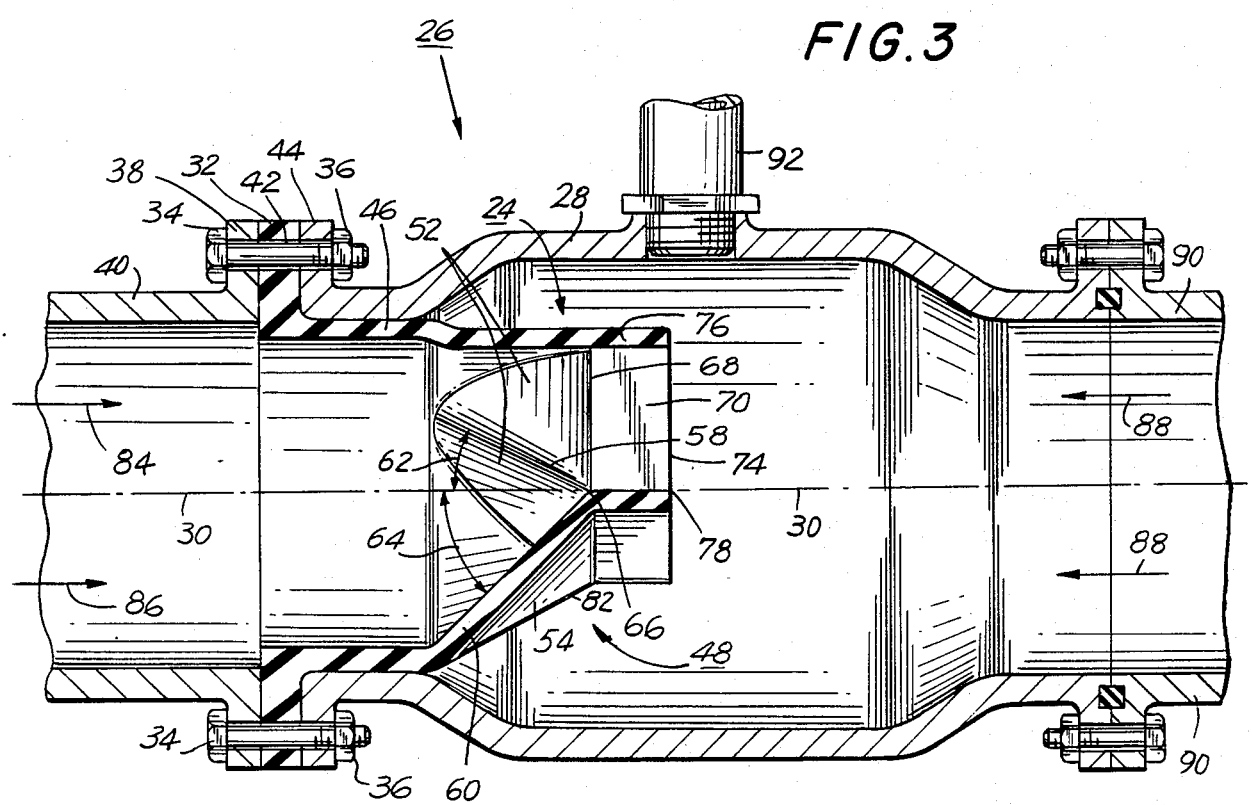
FIG. 3

TIDE GATE VALVE

CROSS-REFERENCE TO RELATED APPLICATION

The instant application is a continuation-in-part of co-pending application Ser. No. 220,962, filed Dec. 29, 1980, now abandoned.

BACKGROUND OF THE INVENTION

1. Field of the Invention

This invention relates to a tide gate check valve for large-sized conduits, particularly storm sewer pipes having diameters on the order of at least about 36 inches.

2. Description of the Prior Art

A check valve is essentially a valve which allows fluid flow in only one direction through a tube, pipe, duct or conduit, while closing and preventing back or reverse flow, when back pressure builds up downstream of the valve to a level greater than the initial fluid pressure head.

Many types of check valves have been proposed in the prior art, especially spring-loaded check valves, in which there are moving parts. In many instances, a substantial pressure differential is required to open and close such types of check valves. Thus, such valves entail a substantial pressure loss in many instances, and such valves may jam in the open position, due to the provision of the usual shafts, pivot pins, bushings or bearings. Pin and bearing fatigue often cause failure in such check valves. The valve seat may leak due to foreign matter or seat obstructions. Noise, slamming or chatter are frequently prevalent with such types of check valves. Sliding, rotating, swinging and plunging parts lead to wear and failure or jamming, especially when handling slurries or other fluids containing entrained particulate solid material. Thus, many types of mechanical check valves of the prior art are subject to leakage, noisy operation, high pressure loss, and stuck open valves. A fail-safe fluid control valve which functions as a check valve is disclosed in U.S. Pat. No. 4,071,038.

One variety of check valve which has been developed in recent years entails a valve body in which there is a flexible resilient check sleeve which terminates with a tapered duck-bill configuration and a rectilinear outlet end which opens to an oval or circular shape to accommodate successively greater fluid flow, but which closes on back pressure build-up. One problem with such valves, especially in larger sizes, is that when a high back pressure is induced, the duck bill sleeve collapses and inverts, thus permitting back flow of fluid.

This problem is especially acute in handling storm sewer effluent to tidal discharge. All cities near waterways use tide gate valves, such a valve being a hinged, wooden, large diameter valve attached to the discharge end of the storm sewer pipe. When there is a storm, storm water from the streets runs into these very large storm sewers and flows either into the ocean or rivers. When the tide is in, these storm sewers back fill with either ocean or river water. This leaves no storage capacity in the sewer. This causes flooding in cities during a heavy downpour, and may actually flood out metropolitan areas. Tide gates were invented over 100 years ago and have not been improved to any substantial degree since then. Trees, logs and bricks get into these gates and jam them. Up to the present, there was no feasible check valve for large sized ducts and conduits of 36", 72", or even greater diameter. A design problem in such cases is inversion, because for a large diameter check valve, the area is quite great, and the even low back pressure multiplied times the area will invert and collapse the flexible sleeve of the duck bill check valves, thus allowing reverse flow of fluid to take place.

SUMMARY OF THE INVENTION

1. Purposes of the Invention

It is an object of the present invention to provide an improved tide gate check valve for large-sized conduits such as storm sewer pipes.

Another object is to provide a flexible check sleeve type of check valve which merely closes and does not collapse and invert when high back pressure builds up.

A further object is to provide a check valve especially suited for large-sized ducts and conduits of 36" or 72" diameter or even larger.

An additional object is to provide a check valve of the flexible check sleeve type which has a full bore sleeve element with non-clogging streamline flow and quiet operation in service.

An object is to provide a check valve which is simple and inexpensive yet effective, and which may readily be produced at low cost in mass production facilities using unskilled labor, and which is easily installed and serviced.

An object is to provide a check valve which is relatively simple in design and fabrication, and which has only two parts, namely, the outer body and the inner flexible resilient check sleeve.

An object is to provide a check valve in which all sliding, rotating, swinging and plunging parts are eliminated.

An object is to provide a check valve of advanced configuration which is free opening and non-slam closing.

An object is to provide a check valve which can be installed in any horizontal or vertical flow up position.

An object is to provide a check valve which provides a straight, uninterrupted and unrestricted flow area.

An object is to provide a check valve in which pressure loss is less than with any other type of check valve.

An object is to provide a check valve which opens with less than 1 psi pressure, and in which there is no slamming when the valve closes against back flow.

An object is to provide a check valve which will seal around seat obstructions.

An object is to provide a check valve suitable for installation in large-sized ducts and conduits, e.g. for buried service, and on raw, unscreened sewage, or on large-sized storm water ducts and conduits.

An object is to provide a check valve with a flexible resilient check sleeve which will respond with only the slightest pressure differential and will seal drop tight against debris caught in the seat.

An object is to provide a check valve which is ideal for large-sized ducts and conduits handling slurry, sewage and sludge.

An object is to provide a check valve having none of the problems such as leakage, noisy operation, high pressure loss and stuck open valves which have been associated with prior art check valves.

An object is to provide a check valve having no moving parts, and in which only a minimum of pressure differential is required to open or close the check valve sleeve.

An object is to provide a check valve with a flexing action which will break up solidified fluids, such as lime or carbon.

An object is to provide a check valve which opens to full 100% pipe area, and in which opening begins at less than 1 psi pressure.

An object is to provide a check valve in which the flexible resilient check sleeve cannot jam in the open position, since there is no shaft, pivot pins, bushings or bearings, and consequently pin and bearing fatigue or failure are eliminated.

An object is to provide a check valve in which all foreign matter is washed away in the open position, thus eliminating a leaking seat.

An object is to provide a check valve in which the flexible sleeve absorbs shock and hammer, reduces noise, and seals on debris.

An object is to provide a check valve in which, when pressure reversals above design limits occur, the flexible resilient pinch check sleeve absorbs the reversal and noiselessly prevents slamming or chatter, while closing to prevent reverse flow.

An object is to provide a check valve with a pinch check sleeve which opens to full 100% pipe bore area and which will pass a solid equal to the pipe flow diameter size.

An object is to provide a check valve which is more efficient than, and can replace, tide gates.

An object is to provide a check valve with a flexible resilient pinch check sleeve having a tapered three or four point convergence and closure of a configuration which features the most rigid type of triangular shape predicated on an angle of convergence of about 38°, so that the 3 or 4 point closure or enclosure at the tapered end of the sleeve is rigid on back pressure, and does not collapse or invert but merely closes.

An object is to provide a check valve of the flexible sleeve type, and having a tapered outlet end to the check sleeve, in which the angle created by the pinched closed end of the sleeve forms a triangle which helps to increase strength, so that if there is back pressure on the sleeve, the sleeve will merely close and will not collapse or invert.

These and other objects and advantages of the present invention will become evident from the description which follows.

2. Brief Description of the Invention

In the present invention, a new tide gate check valve of the flexible resilient sleeve type, in which the sleeve tapers and converges to a pinched downstream end closure, is disclosed. Such check valves are normally open to permit downstream flow of a fluid stream, e.g. a process of tailings effluent, sewage or storm water. The check valve stays open because the pressure head of the fluid stream bears against the inner wall of the converging or tapered end of the sleeve, and forces this end open, since the sleeve is flexible and resilient. The check valve is intended to prevent reverse flow of a fluid into the duct or conduit in which it is mounted, and on high back pressure the tapered end converges and closes to seal off the duct or conduit against backwards flow of fluid in a reverse direction into the duct or conduit.

In accordance with the present invention, the present check valve basically entails the provision of a valve body having a generally rectilinear flow-through passage, and a flexible resilient sleeve which is mountable in the valve body coaxially with the passage. The sleeve has an upstream cylindrical fluid inlet end, a downstream fluid outlet end, and a tapered converging intermediate region with at least three equal sized converging sides. The angle of convergence of these sides is a tetrahedron angle of about 38° relative to the central axis of the sleeve. Thus, the converging sides of the tapered region of the sleeve are rigidly triangular and converge to a point on the central axis of the sleeve. The junction between any two adjacent sides is defined by a rectilinear extension of the sleeve consisting of two opposed contiguous rectilinear lips. The laterally outer side edges of the lips are continuously joined in a fluid-impervious extension of the cylindrical fluid inlet end of the sleeve. The laterally inner edges of the lips are unconnected and discrete, and extend along the central axis from the aforementioned point of convergence, to a terminus at the fluid discharge end of the sleeve. Thus, when forward fluid flow pressure head is exerted through the sleeve, from the fluid inlet end, the tapered region of the sleeve will open, up to a maximum open dimension substantially equal to the dimension of the cylindrical fluid inlet end, i.e., when the tapered region is fully opened, the periphery of the resultant passage is generally equal to the perimeter of the cylindrical inlet end of the sleeve. When backward fluid flow pressure is exerted against the tapered region of the sleeve, the sleeve will resist inversion or collapse and will merely close, thereby checking, and preventing backward fluid flow.

In further accordance with this invention, a plurality of reinforcing elements are embedded in the sleeve. The reinforcing elements extend in axial direction along the lips, along the tapered region, and along the upstream end of the sleeve. The reinforcing elements are resilient enough to permit the tapered region to open in response to a pressure head exerted in the downstream direction, but rigid enough to prevent the tapered region from inverting when a high back pressure force is exerted in the upstream direction.

The number of converging sides to the tapered end of the sleeve is preferably three or four, so that either three or four pairs of opposed contiguous rectilinear lips extend radially from the central axis of the sleeve. The number of reinforcing elements corresponds to the number of converging sides.

The flexible resilient sleeve is typically composed of a flexible resilient material such as neoprene, butyl, pure gum rubber, Buna N, EPT, Viton or Hypalon, and the sleeve will usually be reinforced with a fabric ply or plies such as nylon, rayon, woven steel wire or woven aluminum wire. The valve body is typically composed of a metal such as cast iron, carbon steel, stainless steel such as 304 or 316 type stainless steel, aluminum, brass or bronze. While the present check valve may handle virtually any type of fluid, with erosion and corrosion considerations dictating the specific material of construction for the valve body and the sleeve, in preferred applications, the fluid flowing through the sleeve is a liquid or slurry such as raw sewage, storm rain water, lime, sludge, chemical slurry, scum paper stock, or tailings slurry derived from a mining operation or ore processing facility. Generally, the valve body will be provided with at least one flush connection downstream from the sleeve.

The present improved check valve provides numerous salient advantages. The flexible check sleeve merely closes and does not collapse or invert when high back pressure builds up, and consequently the present check valve is eminently suited for large-sized installations and applications, in ducts or conduits of 36" or 72" diameter or even larger. The flexible resilient check sleeve is a full bore sleeve element with non-clogging streamline flow and quiet operation in service. The present check valve is simple and inexpensive yet is efficient and effective, and the valve may be readily produced at low cost in mass production facilities using unskilled labor. The valve is easily installed and serviced. The valve is relatively simple in design and fabrication, and has only two parts, namely the outer body and the inner flexible resilient check sleeve, of specific configuration in accordance with the present invention. The present check valve has no sliding, rotating, swinging or plunging parts, and is not spring-loaded; hence, wear or metal fatigue cannot take place. The present advanced check valve configuration is free opening and non-slam closing. The valve can be installed in any horizontal or vertical flow up position. The present valve provides a straight, uninterrupted and unrestricted flow area. Pressure loss in the present valve is less than with any other type of check valve; the valve opens with less than 1 psi pressure, and there is no slamming when the valve closes against back flow. The valve seals around seat obstructions such as solid particulate matter.

The present check valve is eminently suitable for installation in large sized ducts and conduits, e.g. for buried service, and on raw, unscreened sewage, or on large sized storm water ducts and conduits. The present check valve features a flexible resilient check sleeve of specific configuration, which will respond with only the slightest pressure differential, and which will seal drop tight against debris caught in the seat. Thus, the present check valve is ideal for large-sized ducts and conduits handling slurry, sewage and sludge, because of resistance to collapsing or inversion which could lead to back flow, on reverse flow pressure build-up. The present check valve eliminates leakage, noisy operation, high pressure loss and stuck open valves, which are all objectionable aspects of prior art check valves. The present valve has no moving parts, and only a minimum of pressure differential is required to open or close the check valve sleeve. The sleeve has a flexing action which will break up solidified fluids, such as lime or carbon. The present check valve, i.e. the sleeve, opens to full 100% pipe area, and opening normally begins at less than 1 psi pressure. The flexible resilient check sleeve cannot jam in the open position, since there is no shaft, pivot pins, bushings or bearings, and consequently pin and bearing fatigue or failure are eliminated. In the present check valve, all foreign matter is washed away in the open position, thus eliminating a leaking seat. The present flexible resilient sleeve absorbs shock and hammer, reduces noise, and seals on debris.

In the present check valve, when pressure reversals above design limits occur, the flexible resilient pinch check sleeve absorbs the reversal and noiselessly prevents slamming or chatter, while closing to prevent reverse flow. The pinch check sleeve opens to full 100% bore area of the pipe, duct or conduit, and will pass a solid equal to the flow diameter size of the pipe, duct or conduit. The present check valve is more efficient than, and can replace, tide gates. The present flexible resilient pinch check sleeve features a tapered three or four point convergence and closure of a configuration which includes and features the most rigid type of triangular shape, predicated on an angle of convergence of about 38°, so that the three or four point closure or enclosure at the tapered region of the sleeve is rigid on back pressure, and does not collapse or invert but merely closes to prevent reverse or back flow of fluid into the pipe, duct or conduit. The present check valve of the flexible sleeve type has a tapered outlet end to the check sleeve, in which the angle created by the pinched, closed end of the sleeve forms a triangle which helps to increase strength, so that if there is back pressure on the sleeve, especially in large sized installations on ducts and conduits, the sleeve will merely close to prevent back or reverse flow into the duct or conduit, and will not collapse or invert.

The invention accordingly consists in the features of construction, combination of elements, and arrangement of parts, which will be exemplified in the device and article of manufacture hereinafter described, and of which the scope of application is as elucidated, supra, and as will be indicated in the appended claims.

BRIEF DESCRIPTION OF THE DRAWINGS

In the accompanying drawings in which are shown several of the various possible embodiments of the invention:

FIG. 1 is a perspective view of a prior art duckbill sleeve for a check valve;

FIG. 2 is a perspective view of a flexible resilient three-point tapered convergence sleeve for a check valve of the present invention;

FIG. 3 is a sectional elevation view showing the sleeve of FIG. 2 as installed in a check valve of the present configuration;

DETAILED DESCRIPTION OF THE PREFERRED EMBODIMENTS

Figure 4:
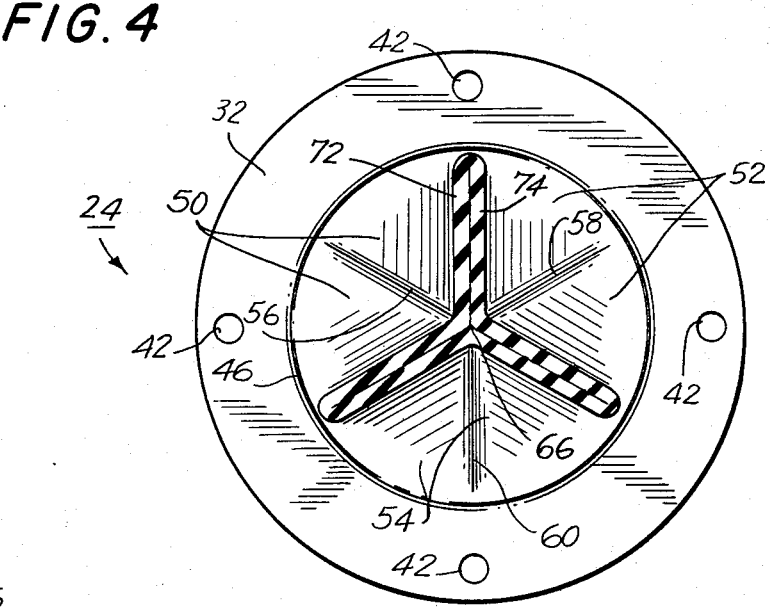
FIG. 4 is a sectional elevation view taken substantially along the line 4—4 of FIG. 2.

Referring now to FIG. 1, a prior art duckbill type of flexible resilient sleeve 10 for a check valve is shown. In this prior art configuration, the sleeve 10 has a generally flat angular convergence of two opposed sides 12 and 14 to a flat rectilinear fluid discharge end 16, which opens successively to an oval shape and then to a generally circular shape on fluid flow in the downstream direction indicated by arrow 17. Reverse or back pressure causes the two sides 12 and 14 to converge and close to the shape shown in FIG. 1, with rectilinear end 16 closed to prevent reverse fluid flow. However, in this sleeve 10 a large surface area of sides 12 and 14 is exposed to back pressure, and consequently such back pressure, as shown by upstream arrow 18, easily causes the sides 12 and 14 to collapse, leading to inversion of the sleeve 10 and back or reverse flow of the fluid as indicated by arrow 18. The sleeve 10 also includes a connecting a mounting flange 20 provided with bolt holes 22, so that the sleeve 10 can be mounted in a suitable valve body, or attached to the end of a tube or pipe. Prior art duckbill sleeves such as sleeve 10 are thus unsuited for application to a large-sized duct or conduit, because in larger sized applications, when a high back pressure is induced, the duckbill sleeve will readily collapse and invert.

FIGS. 2, 3 and 4 show a preferred embodiment of the invention, namely a tapered three-point convergence flexible resilient sleeve 24 for a check valve 26 having a typically metal valve body 28 which has a generally rectilinear flow-through passage about and along central longitudinal axis of symmetry 30, FIG. 3, which central axis 30 is also the central axis of the sleeve 24, as seen in FIG. 2. The flexible resilient sleeve 24 is usually composed of rubber or plastic or the like, and sleeve 24 is mountable, and is mounted in the valve body 28 (FIG. 3), coaxially with the flow-through passage and along axis 30. As shown in FIG. 3, a flange 32 at the inlet end of the sleeve 24 is the mounting means for the sleeve 24. Thus, bolts 34 secured by nuts 36 extend successively through bolt holes in the flange 38 at the outlet of duct or conduit 40, holes 42 in the flange 32, and holes in the inlet flange 44 of the valve body 28. The sleeve 24 has an upstream cylindrical fluid inlet end region 46, a downstream fluid outlet end region, and a tapered converging intermediate region 48 with three equal-sized pairs of converging sides 50, 52 and 54. Each converging side may have an inward slope on each half of the side to a central longitudinal rectilinear crease along the center of the side such as crease or partial fold 56 (side 50), crease 58 (side 52), and crease 60 (side 54), the latter crease being shown as an edge (FIG. 3). The angle of convergence of each crease 56, 58 60 is a tetrahedron angle of about 38° relative to the central axis 30, as shown in FIG. 3, see angles 62 and 64. Thus, the converging sides 50, 52 and 54 of the tapered end 48 of the sleeve 24 are rigidly triangular, and converge to a point 66 on the central axis 30 of the sleeve 24.

The junction 68 between any two adjacent sides, e.g. sides 50 and 52, of the sleeve 24, is defined by a rectilinear extension 70 of the sleeve 24 consisting of two opposed rectilinear lips 72, 74. The laterally outer side edges of the lips 72, 74 are continuously joined at 76 in a fluid-impervious extension of the cylindrical fluid inlet end region 46 of the sleeve 24. The laterally inner edges of the lips, e.g. edges extending between point 66 and a point 78, are unconnected and discrete, and extend along the central axis 30 from the point 66 of convergence of the sides 50, 52 and 54, to the terminus point 78 at the inner fluid discharge end of the sleeve 24. Similarly, junctions 80 and 82 are, respectively, between adjacent sides 50, 54 and 52, 54.

When a fluid flow pressure head in the downstream direction, as indicated by arrows 84, 86 (FIG. 3), is exerted through the sleeve 24, from the fluid inlet end defined by flange 32 and cylindrical fluid inlet end region 46, the tapered region 48 will open, up to a maximum open dimension generally equal to the dimension of the fluid inlet end 46, i.e. when the tapered region 48 is fully open, the periphery of the resultant passage is generally equal to the perimeter of the cylindrical inlet end 46 of the sleeve 24. When fluid flow pressure is exerted against the tapered region 48 of the sleeve 24 in the upstream direction, as indicated by arrows 88 (FIG. 3), e.g. from a downstream discharge pipe, duct or conduit 90, the sleeve 24 will resist inversion and will not collapse, and will merely close as shown in FIGS. 2 and 3, thereby checking, and preventing backward fluid flow in the direction indicated by arrows 88. As best seen in FIGS. 2 and 4, three pairs of opposed contiguous rectilinear lips, such as lips 72, 74, extend radially from the central axis 30, i.e. from a rectilinear line defined as extending between points 66 and 78. As seen in FIG. 3, the valve body 28 is provided with a flush connection 92 downstream from the sleeve 24.

Figure 5:
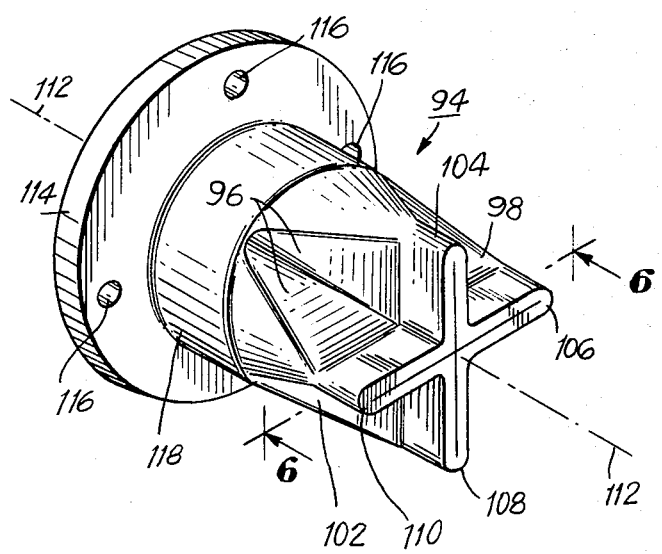
FIG. 5 is a perspective view of a flexible resilient four-point tapered convergence sleeve for a check valve of the present invention.
Figure 6:
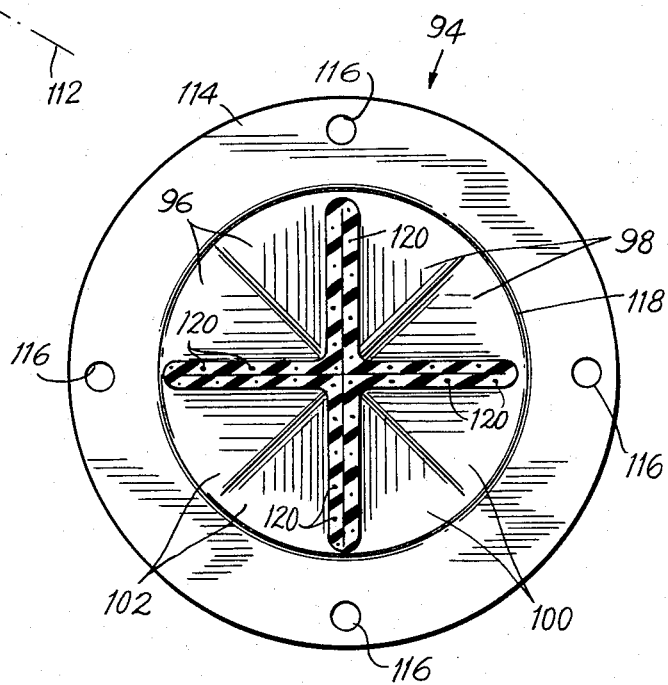
FIG. 6 is a sectional elevation view taken substantially along the line 6—6 of FIG. 5.

FIGS. 5 and 6 illustrate an alternative flexible resilient check valve sleeve 94 in accordance with the present invention, in which the number of converging sides of the sleeve 94 is four, namely sides 96, 98, 100 and 102, so that four pairs 104, 106, 108 and 110 of opposed contiguous rectilinear lips extend radially from the central axis 112 of the sleeve 94. Other appurtenances of the sleeve 94, e.g. flange 114 provided with bolt holes 116, and cylindrical fluid inlet end 118 of the sleeve 94, are as before. In these FIGS. 5 and 6 embodiments of the invention, the sleeve 94, composed of rubber or plastic or the like, is provided with a plurality of integral threads or fabric plies 120, shown in cross-section (FIG. 6), which are composed of nylon, rayon, cotton or the like.

In general, the inlet flanges such as flanges 32 and 114, and the cylindrical fluid inlet ends of the sleeve, such as ends 46 and 118, will be coaxially aligned along the respective central axis 30 or 112.

Figure 7:
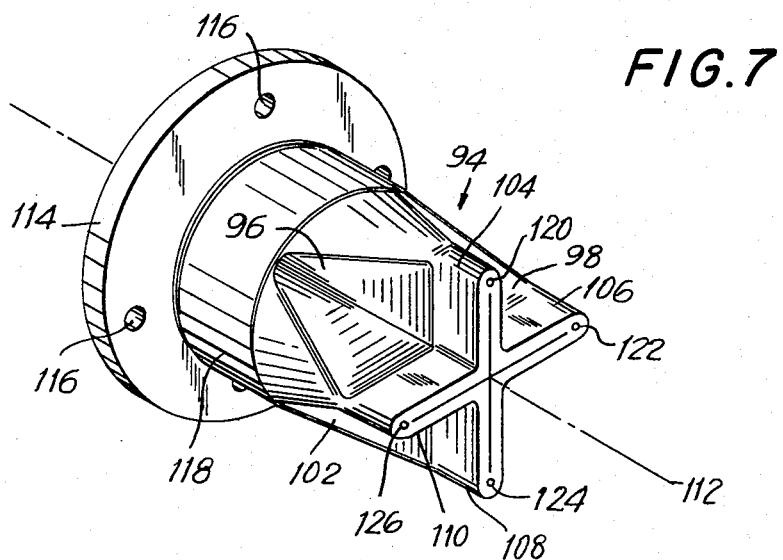
FIG. 7 is a view analogous to FIG. 5, but showing the embedded reinforcing elements.
Figure 8:
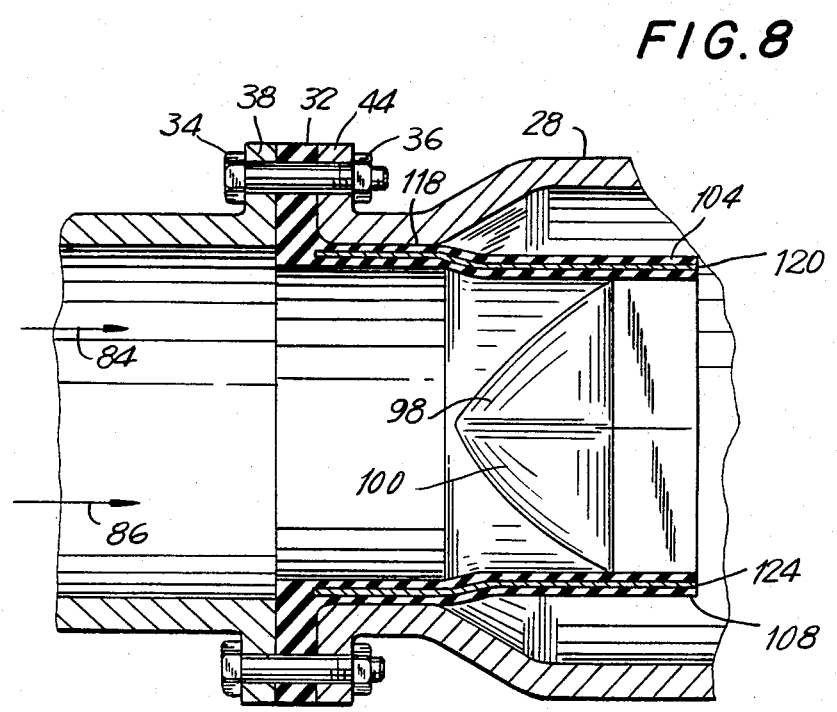
FIG. 8 is a view analogous to FIG. 3, but showing the embedded reinforcing elements of FIG. 7.

FIGS. 7 and 8 are analogous to FIGS. 5 and 3 and illustrate a modified version of the FIG. 5 embodiment equipped with a plurality of reinforcing elements 120, 122, 124, 126 operative for resisting inversion of the sleeve 94. Each reinforcing element is preferably a resilient or rigid metal rod embedded in the sleeve and extends from the upstream cylindrical end region 118, lengthwise along the tapered intermediate region, and lengthwise along the lips to the downstream end face of the sleeve. As shown in FIG. 7, each reinforcing element is located between the outer and inner edges of a respective pair of lips. The reinforcing elements are resilient enough to permit the tapered region and lips to readily open when a pressure head is exerted along the downstream direction and to readily close when the pressure head is no longer exerted. The reinforcing elements are rigid enough to prevent the tapered region and lips from inversion and collapse when a pressure head is exerted along the upstream direction. The interior location of the reinforcing elements within the sleeve, rather than in the flow-through passage of the sleeve, prevents obstructions from forming in and jamming the sleeve passage.

Numerous alternatives within the scope of the present invention will occur to those skilled in the art. In general, the tide gate check sleeve will be constructed so that the expected back pressure dictates the number of nylon plies 120 and/or reinforcing elements which are provided in practice. In addition, when the check sleeve is to be exposed to excessive back pressure, the walls of the check sleeve are increased in thickness, so that the thickness area of the mass of rubber wall is greater than the cross-sectional area of the inner through passage of the check sleeve, considered as a function of the inside diameter of the check sleeve.

It thus will be seen that there is provided a tide gate check valve device as an article of manufacture which achieves the various objects of the invention, and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

I claim:

1. An inversion-resistant tide gate valve for large-sized sewage conduits, particularly storm sewer pipes having diameters on the order of 36", 72" and greater, comprising:
   (a) a valve body having a flow-through passage for sewage fluids;
   (b) a flexible, resilient sleeve elongated along an axis of symmetry and mountable in the valve body in co-axial relationship with the passage, said sleeve having an upstream fluid inlet end region in constant fluid communication with the passage, a downstream fluid outlet end region, and a tapered intermediate region between the inlet and outlet regions,
   (i) said tapered region having a plurality of pairs of converging sides circumferentially arranged about the symmetry axis, each pair of converging sides having two side walls which meet at and extend along an inclined crease line that converges at an angle of about 38° relative to the symmetry axis at a a point thereon,
   (ii) said downsteam end region having a pair of opposed lips at each junction between the pairs of converging sides, each pair of lips extending in the axial direction from said point of convergence to a downstream end face on the downstream end region, each pair of lips having lateral outer edges which extend along the symmetry axis, all of the lateral outer edges being continuously joined and bounding a fluid-impervious extension of the tapered region, each pair of lips also having lateral inner edges which are unconnected and discrete and are movable away from each other in response to a pressure head exerted along the downstream direction; and
   (c) means for resisting inversion of the sleeve in response to a back-pressure force exerted along the upstream direction, said inversion-resisting means including a plurality of axially-extending reinforcing elements embedded in the sleeve at each pair of opposed lips between the inner and outer edges thereof, the number of reinforcing elements corresponding to the number of pairs of lips, each reinforcing element extending along the respective pair of lips along the upstream, tapered and downstream regions to the downstream end face of the latter.

2. The tide gate valve as defined in claim 1, wherein each reinforcing element is constituted of a resilient metallic material.

3. The tide gate valve as defined in claim 1, wherein each reinforcing element is rod-shaped.

4. The tide gate valve as defined in claim 1, wherein the sleeve is reinforced with fabric ply.

* * * * *